United States Patent [19]
Groening et al.

[11] 3,852,212
[45] Dec. 3, 1974

[54] METHOD OF PRODUCING HYDRATED SODIUM TRIPOLYPHOSPHATE COMPOSITION

[75] Inventors: Harvey F. Groening; Paul L. Hensler, both of Lawrence, Kans.

[73] Assignee: FMC Corporation, New York, N.Y.

[22] Filed: Nov. 29, 1972

[21] Appl. No.: 310,309

[52] U.S. Cl.................. 252/135, 252/99, 252/156
[51] Int. Cl............................................. C11d 3/06
[58] Field of Search ....... 252/135, 99, 156; 423/315

[56] References Cited
UNITED STATES PATENTS

| | | | |
|---|---|---|---|
| 3,056,652 | 10/1962 | Ryer .............................. | 252/135 X |
| 3,063,801 | 11/1962 | Groves ............................. | 252/135 |
| 3,233,967 | 2/1966 | Shen ................................. | 252/135 |
| 3,338,671 | 8/1967 | Marshall et al. ................... | 252/135 |

*Primary Examiner*—Benjamin R. Padgett

[57] ABSTRACT

This invention is concerned with the method of producing hydrated sodium tripolyphosphate having a reduced bulk density by adding at least 2 percent of sodium pyrophosphate to the anhydrous sodium tripolyphosphate feed prior to its being treated with water to effect hydration.

3 Claims, No Drawings

METHOD OF PRODUCING HYDRATED SODIUM TRIPOLYPHOSPHATE COMPOSITION

This invention is concerned with the production of hydrated sodium tripolyphosphate of controlled particle size and bulk density, in a form such that it can be readily used in the preparation of mixed formulations containing sodium tripolyphosphate and other ingredients such as surfactants, bleaching materials, optical brighteners, extenders, and the like, all of which are commonly used in the manufacture of laundering, detergent and bleaching compositions.

In the manufacture of such compositions, it is often desired to use sodium tripolyphosphate in the hydrated form, rather than in the dehydrated form in which it is customarily made from phosphoric acid and a source of sodium oxide. The anhydrous material is made by drying an aqueous solution containing dissolved sodium oxide and phosphorus oxide values in the desired ratio, either by spray drying to produce hollow spheres of rather low bulk density, or by conventional drying techniques to produce masses of rather high density, which are ground to the desired particle size range.

One difficult problem producing hydrated sodium tripolyphosphate from the anhydrous product and water is that of reducing the bulk density of the hydrated product to desirable limits. For certain uses hydrated sodium tripolyphosphate having a bulk density of about 0.65 to about 0.71 g/cc is desired. Another difficulty is that the hydration reaction is exothermic, so that if care is not taken to avoid localized heating of the sodium tripolyphosphate above its conversion point, off-grade material results.

One process for reducing the bulk density of hydrated sodium tripolyphosphate is set forth in U.S. Pat. No. 3,469,938, wherein the bulk density of the product is reduced compared with that of the feed material, by controlling the amount of fines which are fed to the hydrator. The fines act as a cement during the hydration with the water used to hydrate the product and tie the particles together more loosely than the granules of the original anhydrous material, thereby producing material of lower bulk density. This technique is useful in lowering the bulk density materially, but it is difficult to routinely reach and maintain bulk densities as low as 0.65 to 0.71 g/cc. On occasion, the bulk density will get down as low as 0.65 g/cc using this technique, but normally the bulk density remains above 0.71 g/cc in most of the recovered product. For routine production where the bulk density of the product must be between 0.65 to 0.71 g/cc the above process alone will not produce a satisfactory product.

Other processes for maintaining the hydration relatively uniform with low temperature is also set forth in U.S. Pat. No. 3,046,092. In this process, however, the hydration does not reduce the bulk density of the feed material.

We have now found that it is possible to produce a hydrated sodium tripolyphosphate having a bulk density of 0.65 to 0.71 g/cc by feeding anhydrous sodium tripolyphosphate containing at least about 10 percent by weight of fines (−100 mesh U.S. standard) to a hydration stage, adding at least about 2 percent by weight of an alkali metal pyrophosphate (preferably 2 to 7 percent) to the anhydrous sodium tripolyphosphate, hydrating the anhydrous material with no more than 105 percent of the theoretical amount necessary to produce the hexahydrate, distributing the water uniformly over the tripolyphosphate while it is being agitated at such a rate that the temperature is kept below about 80° C, recovering an agglomerated product of lower bulk density than the original material, preferably drying the resulting agglomerated product at a temperature below about 80° C to protect it against decomposition, grinding the resulting agglomerated product to produce a mixture of fines and a product of desired particle size range (about −20 and +60 mesh), separating granules of the desired particle size range as product and recycling the fines to the hydration stage.

Sodium tripolyphosphate is generally made by drying an aqueous solution containing phosphoric acid and soda ash in which the molar ratio of Na/P is about 1.67. The solution is dried, and the dried material calcined to produce an anhydrous material which is generally present in two different phases, depending on the drying and calcining conditions and which are known as Phase I and Phase II. The resulting material when sold as anhydrous material is generally ground to the desired particle size, has a pH of about 9.9 in aqueous solution, and a bulk density of about 0.9.

This anhydrous material can be hydrated to the hexahydrate by the controlled addition of enough water to give a product containing 22.7 percent water (theoretical for the hexahydrate).

In our process the anhydrous sodium tripolyphosphate was prepared in conventional fashion in the plant from an aqueous solution of phosphoric acid, soda ash and water, using a molar ratio of Na/P of 1.67. The solution was dried and the dried material calcined to the anhydrous stage. The resultant, lumpy product was ground to produce a mixture of granules and powder containing at least 10 percent (by weight of the anhydrous feed) of −100 mesh material, and generally substantially more than this.

The ground, anhydrous sodium tripolyphosphate was then mixed with at least about 2 percent of an alkali metal pyrophosphate, preferably sodium pyrophosphate. The alkali metal pyrophosphates include sodium pyrophosphate, potassium pyrophosphate, sodium acid pyrophosphate and other such pyrophosphate salts. The pyrophosphate is preferably in the form of a powder (−100 mesh) for ease of mixing and distribution. The preferred amount of pyrophosphate which is added to the anhydrous sodium tripolyphosphate is on the order of about 2 to about 7 percent, based on the weight of the anhydrous feed, although larger amounts of the pyrophosphate are not deleterious to the product, provided the product meets the required assay for sodium tripolyphosphate. The resulting mixture of ground sodium tripolyphosphate and alkali metal pyrophosphate were then fed into a rotary hydrator in which the desired amount of water was sprayed onto the product. Generally, water is added, not in excess of 105 percent of the theoretical quantity of water necessary to produce the hexahydrate. The water is distributed uniformly over the feed material while it is being agitated in the rotary hydrator at a rate to maintain the hydrated mixture below 80° C. The resulting product from the hydrator is not a completely hydrated product. We find this to be most desirable, in that when the product contains less bound water than theoretical for the hexahydrate it actually is more stable on storage than a fully hydrated material. The product may have anywhere from 2 to 25% less bound water than theoretical for the hexahydrate.

The resulting agglomerated material from the rotary hydrator is then fed to a dryer where small amounts of free water present therein, generally under 5 percent, are removed on contact with warm air. It is only necessary in this dryer to keep the temperature of the material low enough so that the tripolyphosphate is not dehydrated to another form of polyphosphate.

This can be accomplished by keeping the temperature of the product below 80° C which is easy to achieve since only a small amount of water need be removed. This drying stage can readily be accomplished by showering the hydrated material through a stream of warm air in a rotary dryer using an air inlet temperature on the order of 80° to 165° C. Any other means of drying the product can be used providing the temperature is not raised above the decomposition point of the tripolyphosphate, i.e., about 80° C. The product removed from the dryer generally contains some oversized material which is ground and screened. The desired particle size fraction (−20 to +60 U.S. standard mesh) is collected as product, while any fines preferably are recycled to the hydrator.

As a result of the above hydration process the anhydrous sodium tripolyphosphate is converted from a bulk density of about 0.90 g/cc to 0.65 to 0.71 g/cc. The resulting product has a pH in solution of about 9.9 corresponding with that of the anhydrous material. The resulting product contains from about 80 to 100 percent of the water necessary to complete hydration of the hexahydrate (22.7 percent), and preferably from 80 to 98 percent of theoretical, with a normal water content of from about 18 to about 22.2 percent water.

The manner in which the alkali metal pyrophosphate operates to lower the bulk density is not known. However, when the pyrophosphate is added to the ground anhydrous sodium tripolyphosphate feed (containing at least 10 percent −100 mesh fines) and the mixture is hydrated the resulting hydrated product can be routinely kept within a bulk density range of 0.65 to 0.71 g/cc as desired.

The following is a typical example of the invention as practiced by us, and is given not by way of limitation, but merely as descriptive of the invention.

Anhydrous sodium tripolyphosphate with a Phase I content ranging from 28 to 37 percent was obtained from a plant rotary dryer. This material was ground to yield a feed containing 30 percent −100 mesh, 15 percent +30 mesh, and 3 percent +20 mesh. The anhydrous sodium tripolyphosphate had a bulk density of from 0.89 to 0.91. The ground anhydrous sodium tripolyphosphate was fed to a hydrator at a rate of 4,000 pounds per hour. The hydrator was a 27-inch diameter tube, 14 feet long. It had a 4-inch high dam at the discharge end and a 7-inch high dam at the inlet. It was sloped 0.2 inches per foot towards the discharge end. Four 1-inch high flights were equally spaced throughout the hydrator. The hydrator was rotated at 22 rpm and water was added at a rate of 1,200 pounds per hour through seven spray nozzles in the hydrator. The resulting hydrator spill was charged directly into a rotary dryer where any free water was removed by showering the material through a stream of warm air (135°–163°C). The spill from the rotary dryer, at a temperature of 70° C, was transferred directly to a screen where the granule product was separated from the oversized particles and fines. The resulting product fraction, essentially −20 +60 mesh, was separated from oversized material and the latter was recycled through a mill and fed back to the screen. Undersized material, or fines, were recycled back to the hydrator.

During the first 6 hours of operation, no sodium pyrophosphate was added to the feed. The bulk density of the product during this period ranged from 0.713 to 0.729 g/cc. Thereafter, sodium pyrophosphate was added at a rate of 3.5 percent of the anhydrous feed. The bulk density of the resulting product was rapidly reduced to 0.671 g/cc and then reached 0.665 g/cc where it remained substantially stable. Thereafter, for a 3 hour period no sodium pyrophosphate was added; the bulk density rapidly increased to 0.693 g/cc, and continued rising to 0.697 g/cc, at which point further testing was discontinued.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

What is claimed is:

1. In the method of producing hydrated granular sodium tripolyphosphate of low bulk density wherein anhydrous sodium tripolyphosphate feed material, containing at least 10 percent by weight of anhydrous sodium tripolyphosphate having a particle size below 100 mesh, is hydrated with not in excess of 105 percent of the theoretical quantity of water necessary to produce the hexahydrate, and wherein the water is distributed uniformly over said anhydrous feed material while it is being agitated at a rate to keep the hydrating mixture below 80° C and to produce an agglomerated hydrate by the action of the water, grinding the coarse, agglomerated hydrate, separating a particle size range of about −20 to +60 mesh as product, and recycling remaining hydrated sodium tripolyphosphate fines to the feed material, the improvement which comprises adding to said anhydrous sodium tripolyphosphate feed material prior to hydration at least about 2 percent by weight of an alkali metal pyrophosphate and recovering a sodium tripolyphosphate hexahydrate product whose bulk density has been reduced to a range of from 0.65 to 0.71 g/cc.

2. Process of claim 1 wherein the alkali metal pyrophosphate is sodium pyrophosphate and it is added in amounts of from about 2 to 7 percent by weight of the anhydrous feed material.

3. The method of claim 1 in which the product is hydrated to a point between 80 and 98 percent of theoretical for hexahydrate.

* * * * *